United States Patent [19]

Murakami et al.

[11] 4,089,239
[45] May 16, 1978

[54] SPEED CHANGE GEAR SYSTEM

[75] Inventors: Noboru Murakami, Nagoya; Koichiro Hirosawa, Kariya; Kazuo Ohara; Koichi Matsuo, both of Toyota, all of Japan

[73] Assignee: Aisin Seiki Kabushiki Kaisha, Japan

[21] Appl. No.: 651,259

[22] Filed: Jan. 22, 1976

[30] Foreign Application Priority Data

Feb. 7, 1975 Japan .................................. 50-16497

[51] Int. Cl.² .......................... F16H 3/44; F16H 57/10
[52] U.S. Cl. ........................................ 74/761; 74/759; 74/753
[58] Field of Search ................ 74/753, 759, 761, 758, 74/760, 764, 765

[56] References Cited

U.S. PATENT DOCUMENTS

| | | | |
|---|---|---|---|
| 3,147,643 | 8/1964 | Christenson et al. | 74/764 X |
| 3,410,157 | 11/1968 | Livezey | 74/764 X |
| 3,863,524 | 2/1975 | Mori et al. | 74/765 |

*Primary Examiner*—Samuel Scott
*Assistant Examiner*—Don E. Ferrell
*Attorney, Agent, or Firm*—Oblon, Fisher, Spivak, McClelland & Maier

[57] ABSTRACT

A speed change gear system for providing at least four forward drive speed ranges and one reverse drive speed range includes three planetary gear sets of the single-pinion type, three clutches, and two brakes. As a result of the coupling and uncoupling of the clutches and brakes, the movable elements of each of the planetary gear sets are suitably coupled so as to attain the various speed ranges.

13 Claims, 9 Drawing Figures

SPEED CHANGE GEAR SYSTEM

BACKGROUND OF THE INVENTION

1. Field of the Invention

The present invention relates generally to speed change gear systems and more particularly to a speed change gear system which is adapted for application with fluid couplings utilized within motor vehicles, especially automobiles.

2. Description of the Prior Art

It is preferable to utilize at least four gear sets within the speed change gear systems of large automotive vehicles, such as for example, trucks and buses, and in order to attain a speed change mechanism having more than four speed shifts, three, four or even more sets of simple, single-pinion or double-pinion type planetary gear sets have heretofore been combined. While the combination of these gears may be widely varied, it is preferable however that the following conditions be attained:

(1) The output shaft should be coupled to the same elements within each speed range.
(2) In order to reduce the circumferential speed of the bearings of each element of the planetary gear set, the number of its revolutions should be small.
(3) The tooth load, that is, the tangential force of each element, should be small so as to maintain the strength of the gear teeth.
(4) The gear set should always attain meshing conditions for the number of teeth required. For example, the sun gear, whose diameter is to be minimized, as well as each planetary pinion gear, should have the necessary number of teeth.
(5) Within each planetary gear set, the coupling relationship among the elements should be simple and the distance from each other should be small.
(6) During speed shifts, wherein frictional coupling means are utilized during forward drive, such speed shifts should be available through one coupling means alone.

SUMMARY OF THE INVENTION

Accordingly, it is an object of the present invention to provide a speed change gear system which provides at least four speed ranges for forward drive and one speed range for reverse drive by the use of three planetary gear sets of the single-pinion type, three clutches, and two brakes, whereby the movable members of each of the planetary gear sets are suitably coupled as a result of the coupling or uncoupling of the clutches and brakes so as to attain the various speed ranges.

BRIEF DESCRIPTION OF THE DRAWINGS

Various other objects, features and attendant advantages of the present invention will be more fully appreciated as the same becomes better understood from the following detailed description when considered in conjunction with the accompanying drawings, in which like reference characters designate like or corresponding parts throughout the several views, and wherein.

DETAILED DESCRIPTION OF THE ILLUSTRATED EMBODIMENTS

Figure 1:
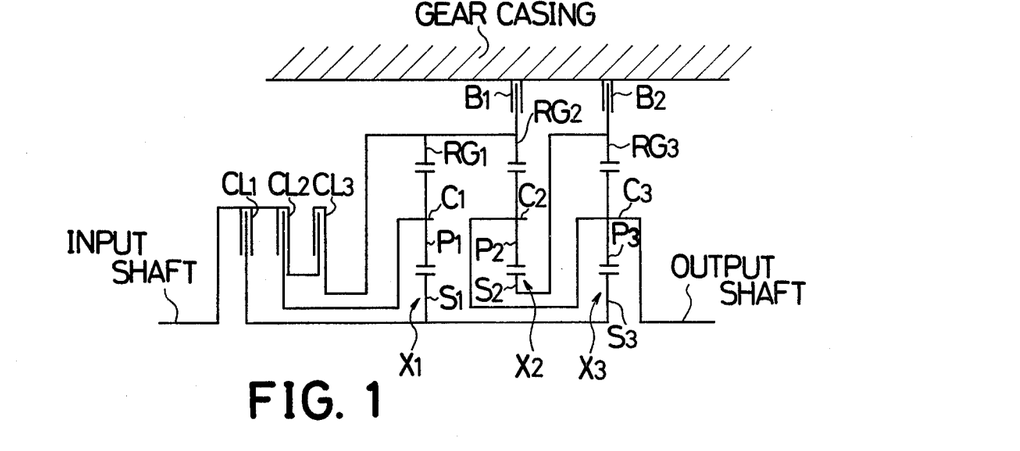
FIG. 1 is a schematic view of one embodiment of a speed change gear system constructed in accordance with the present invention and disclosing its cooperative parts.

Referring now to the drawings and more particularly to FIG. 1 thereof, the disclosed speed change gear system includes a first planetary gear set, generally indicated by the reference character $X_1$, of the single-pinion type, a second planetary gear set, generally indicated by the reference character $X_2$, of the single-pinion type, and a third planetary gear set, generally indicated by the reference character $X_3$, also of the single-pinion type, all of which are interposed between an input shaft and an output shaft.

The first planetary gear set $X_1$ is seen to comprise a first sun gear $S_1$, a first planetary gear $P_1$ engaged with the first sun gear $S_1$, a first ring gear $RG_1$ enmeshed with the first planetary gear $P_1$, and a first carrier $C_1$ rotatably supporting the first planetary gear $P_1$, while the second planetary gear set $X_2$ similarly includes a second sun gear $S_2$, a second planetary gear $P_2$ engaged with the second sun gear $S_2$, a second ring gear $RG_2$ enmeshed with the second planetary gear $P_2$, and a second carrier $C_2$ rotatably supporting the second planetary gear $P_2$.

The third planetary gear set $X_3$ includes a third sun gear $S_3$, a third planetary gear $P_3$ engaged with the third sun gear $S_3$, a third ring gear $RG_3$ enmeshed with the third planetary gear $P_3$, and a third carrier $C_3$ rotatably supporting the third planetary gear $P_3$. It will be further seen that the first sun gear $S_1$ is drivingly connected with the third sun gear $S_3$, as is the first ring gear $RG_1$ with the second ring gear $RG_2$, the second sun gear $S_2$ with the third ring gear $RG_3$, and the second carrier $C_2$ with the third carrier $C_3$ as well as with the output shaft. A first clutch $CL_1$ serves to couple or uncouple the first sun gear $S_1$ and the third sun gear $S_3$ with the input shaft, while a second clutch $CL_2$ serves to couple or uncouple the first carrier $C_1$ with the input shaft, and a third clutch $CL_3$ serves to couple or uncouple the first ring gear $RG_1$ and the second ring gear $RG_2$ with the input shaft.

A first brake $B_1$ is provided so as to be capable of locking the first ring gear $RG_1$ and the second ring gear $RG_2$ to the gear casing when the first brake is actuated, and similarly, a second brake $B_2$ is provided so as to be capable of locking the second sun gear $S_2$ and the third ring gear $RG_3$ to the casing when the same is actuated.

The following equations are given as characteristic of the planetary gear sets $X_1$, $X_2$ and $X_3$:

$$N_{RG_1} - (1 + I_1)N_{C_1} + I_1 N_{S_1} = 0$$

$$N_{RG_2} - (1 + I_2)N_{C_2} + I_2 N_{S_2} = 0$$

$$N_{RG_3} - (1 + I_3)N_{C_3} = I_3 N_{S_3} = 0$$

wherein:

$N_{RG_1}, N_{RG_2}, N_{RG_3}$ = the number of revolutions of the first, second and third ring gears;

$N_{C_1}, N_{C_2}, N_{C_3}$ = the number of revolutions of the first, second and third carriers;

$N_{S_1}, N_{S_2}, N_{S_3}$ = the number of revolutions of the first, second and third sun gears; and $I_1, I_2, I_3$ = the radial ratios of each ring gear with respect to each sun gear.

TABLE 1A

| | CL1 | CL2 | CL3 | B1 | B2 | Reduction Gear Ratio |
|---|---|---|---|---|---|---|
| F1 | • | | | | • | 3.82 |
| F2 | | • | | | • | 2.21 |
| F3 | | | • | | • | 1.48 |
| F4 | • | • | | | | 1.00 |
| R1 | • | | | • | | −4.82 |
| R2 | | | • | • | | −1.50 |

Within this embodiment, the radial ratios within each speed range are $I_1 = 0.452$, $I_2 = 0.484$, $I_3 = 0.355$, and Table 1A shows the relationship between the operation of clutches $CL_1$, $CL_2$ and $CL_3$ and brakes $B_1$, and $B_2$ relative to the gear ratio within each speed range, wherein $F_n (n = 1, 2, 3, ...)$ designates a forward speed range, such as, for example, $F_1$ designates the first forward speed range, $F_2$ designates the second forward speed range, and the like, and $R_n (n = 1, 2, ...)$ designates a reverse speed range, such as, for example, $R_1$ designates the first reverse speed range, and it may be seen that a reduction gear ratio of 1 : 1.00 can be obtained by desirably and selectively employing two of the clutches $CL_1$, $CL_2$ and $CL_3$. Table 1B shows the relationship regarding the number or revolutions and the tangential forces of each of the elements of the planetary gear sets within each speed range, the ratio of the number of revolutions being based upon the assumption that the number of revolutions of the input shaft is 1, while the designated tangential forces are based upon the assumption that the input shaft torque exerted upon the ring gear is 1, the tangential forces of the planetary gears being equal to those of the sun gears and the ring gears.

TABLE 1B

| A | B | X1 | | | | X2 | | | | X3 | | | |
|---|---|---|---|---|---|---|---|---|---|---|---|---|---|
| | | S1 | C1 | RG1 | P1 | S2 | C2 | RG2 | P2 | S3 | C3 | RG3 | P3 |
| F1 | N | 1.00 | 0.58 | 0.39 | −0.69 | 0.0 | 0.26 | 0.39 | 0.26 | 1.00 | 0.26 | 0.0 | −0.81 |
| | W | 0.0 | 0.0 | 0.0 | 0.0 | 0.0 | 0.00 | 0.00 | 0.00 | 2.82 | 5.63 | 2.82 | 2.82 |
| F2 | N | 1.73 | 1.00 | 0.67 | −1.20 | 0.0 | 0.45 | 0.67 | 0.85 | 1.73 | 0.45 | 0.0 | −1.40 |
| | W | 0.69 | 1.38 | 0.69 | 0.69 | 0.69 | 1.38 | 0.69 | 0.69 | 1.75 | 0.88 | 0.88 | 0.88 |
| F3 | N | 2.57 | 1.49 | 1.00 | −1.79 | 0.0 | 0.67 | 1.00 | 1.26 | 2.57 | 0.67 | 0.0 | −2.09 |
| | W | 0.0 | 0.0 | 0.0 | 0.0 | 1.00 | 2.00 | 1.00 | 1.00 | 0.0 | 0.0 | 0.0 | 0.00 |
| R1 | N | 1.00 | 0.31 | 0.0 | −1.14 | −0.64 | −0.21 | 0.0 | 0.80 | 1.00 | −0.21 | −0.64 | −1.33 |
| | W | 0.0 | 0.0 | 0.0 | 0.0 | 5.82 | 11.64 | 5.82 | 5.82 | 2.82 | 5.63 | 2.82 | 2.82 |
| R2 | N | 3.21 | 1.00 | 0.0 | −3.65 | −2.04 | −0.67 | 0.0 | 2.58 | 3.21 | −0.67 | −2.04 | −4.27 |
| | W | 0.69 | 1.38 | 0.69 | 0.69 | 1.81 | 3.62 | 1.81 | 1.81 | 0.88 | 1.75 | 0.88 | 0.88 |

Within Table 1B, like reference characters designate identical or corresponding parts shown within Table 1A, and in addition, A designates a particular speed range, B designates an element of the planetary gear set, N designates the number of revolutions of the elements, and W designates the tangential force thereof. As the reduction gear ratio of the fourth forward speed range $F_4$ is 1 : 1.00, the number of revolutions N of each sun gear, ring gear, and carrier is 1.00, the number of revolutions N of an individual sun gear, ring gear and carrier is 1.00, and the number of revolutions N of each planetary gear is 0.00.

The tangential forces W are therefore considerably less than those produced within the other speed ranges wherein the torque of the input shaft is transmitted to all of the elements through means of only one engaged clutch, while to the contrary, the torque of the input shaft of the fourth speed range $F_4$ is distributed to all elements as a result of engaging at least two clutches, and accordingly, it is clear that the resulting tangential forces of the elements of such speed range are smaller than those produced as a result of the transmission of torque from the input shaft as a result of coupling only one clutch. Hereinafter, a discussion of the number of revolutions N and the tangential forces W within the speed range having the reduction gear ratio of 1 : 1.00 will be omitted.

Figure 2:
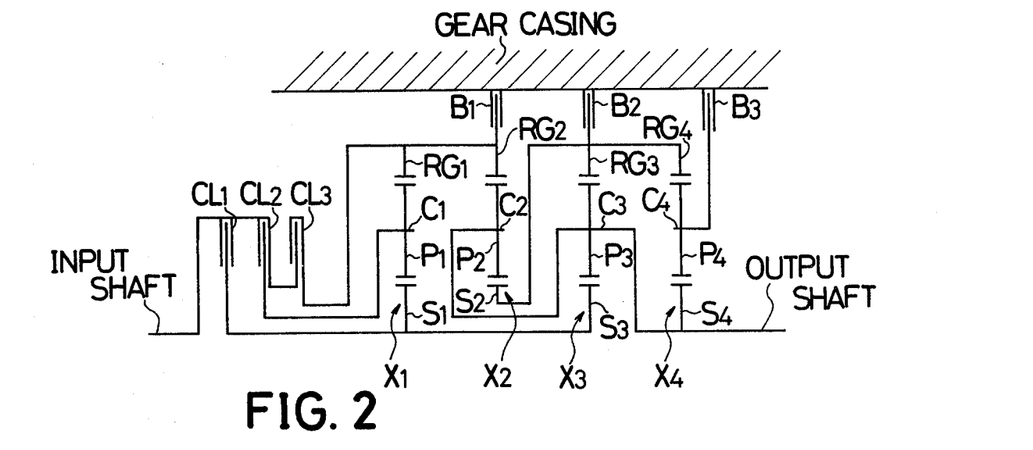
FIG. 2 is a schematic view similar to that of FIG. 1 showing however another embodiment of the present invention.

Referring now to FIG. 2, there is shown another embodiment of the present invention wherein a fourth planetary gear set, generally indicated by the reference character $X_4$, of the single-pinion type is interposed between the third planetary gear set $X_3$ and the output shaft, such fourth planetary gear set $X_4$ including a fourth sun gear $S_4$ connected to the output shaft as well as to the third carrier $C_3$, a fourth planetary gear $P_4$ engaged with the fourth sun gear $S_4$, a fourth ring gear $RG_4$ enmeshed with the fourth planetary gear $P_4$, and a fourth carrier $C_4$ rotatably supporting the fourth planetary gear $P_4$. The fourth ring gear $RG_4$ is also drivingly coupled with the third ring gear $RG_3$ and the second sun gear $S_2$, and is additionally locked to the gear casing when the second brake B2 is actuated. A third brake B3 is also interposed between the fourth carrier $C_4$ and the gear casing so as to be capable of locking the former to the latter when the brake is actuated.

The following formula is given as characteristic of the fourth planetary gear set $X_4$:

$$N_{RG_4} - (1 + I_4)N_{C_4} + I_4 N_{S_4} = 0$$

wherein:

$N_{RG_4}$ = the number of revolutions of the fourth ring gear;

$N_{C_4}$ = the number of revolutions of the fourth carrier;

$N_{S_4}$ = the number of revolutions of the fourth sun gear; and $I_4$ = the radial ratio of the fourth ring gear to the fourth sun gear.

TABLE 2A

| | CL1 | CL2 | CL3 | B1 | B2 | B3 | Reduction Gear Ratio |
|---|---|---|---|---|---|---|---|
| F1 | • | | | | | • | 5.40 |
| F2 | • | | | | • | | 3.82 |
| F3 | | | • | | | • | 2.89 |
| F4 | | | • | | • | | 2.21 |
| F5 | | • | | | | • | 1.76 |
| F6 | | • | | | • | | 1.48 |
| F7 | • | • | • | | | | 1.00 |
| R1 | • | | | | | • | −4.82 |
| R2 | | | • | • | | | −1.50 |

Within this embodiment, the radial ratio within each speed range is $I_4 = 0.562$, and Table 2A shows the relationship between the operation of all of the clutches $CL_1$, $CL_2$, and $CL_3$ and brakes $B_1$, $B_2$ and $B_3$ with respect to the reduction gear ratio within each speed range, while Table 2B shows the relationship regarding the number of revolutions and the tangential forces of the elements of the planetary gear sets within each speed range.

TABLE 2B

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | 1.00 | 0.54 | 0.33 | −0.77 | −0.10 | 0.19 | 0.33 | 0.54 | 1.00 | 0.19 | −0.10 | −0.90 | 0.19 | 0.00 | −0.10 | −0.48 |
| | W | 0.0 | 0.0 | 0.0 | 0.0 | 0.0 | 0.0 | 0.0 | 0.0 | 2.82 | 5.63 | 2.82 | 2.82 | 2.82 | 5.63 | 2.82 | 2.82 |
| F2 | N | 1.00 | 0.58 | 0.39 | −0.69 | 0.0 | 0.26 | 0.39 | 0.49 | 1.00 | 0.26 | 0.0 | −0.81 | 0.26 | 0.09 | 0.0 | −0.43 |
| | W | 0.0 | 0.0 | 0.0 | 0.0 | 0.0 | 0.00 | 0.00 | 0.00 | 2.82 | 5.63 | 2.82 | 2.82 | 0.0 | 0.0 | 0.0 | 0.0 |
| F3 | N | 1.87 | 1.00 | 0.61 | −1.43 | −0.19 | 0.35 | 0.61 | 1.01 | 1.87 | 0.35 | −0.19 | −1.68 | 0.35 | 0.00 | −0.19 | −0.89 |
| | W | 0.69 | 1.38 | 0.69 | 0.69 | 0.69 | 1.38 | 0.69 | 0.69 | 0.88 | 1.75 | 0.88 | 0.88 | 1.21 | 2.42 | 1.21 | 1.21 |
| F4 | N | 1.73 | 1.00 | 0.67 | −1.20 | 0.0 | 0.45 | 0.67 | 0.85 | 1.73 | 0.45 | 0.0 | −1.40 | 0.45 | 0.16 | 0.0 | −0.74 |
| | W | 0.69 | 1.38 | 0.69 | 0.69 | 0.69 | 1.38 | 0.69 | 0.69 | 0.88 | 1.75 | 0.88 | 0.88 | 0.0 | 0.0 | 0.0 | 0.0 |
| F5 | N | 3.08 | 1.65 | 1.00 | −2.36 | −0.32 | 0.57 | 1.00 | 1.67 | 3.08 | 0.57 | −0.32 | −2.76 | 0.57 | 0.00 | −0.32 | −1.46 |
| | W | 0.0 | 0.0 | 0.0 | 0.0 | 1.00 | 2.00 | 1.00 | 1.00 | 0.0 | 0.00 | 0.00 | 0.00 | 0.48 | 0.97 | 0.48 | 0.48 |
| F6 | N | 2.57 | 1.49 | 1.00 | −1.79 | 0.0 | 0.67 | 1.00 | 1.26 | 2.57 | 0.67 | 0.0 | −2.09 | 0.67 | 0.24 | 0.0 | −1.11 |
| | W | 0.0 | 0.0 | 0.0 | 0.0 | 1.00 | 2.00 | 1.00 | 1.00 | 0.0 | 0.00 | 0.00 | 0.00 | 0.0 | 0.0 | 0.0 | 0.0 |
| R1 | N | 1.00 | 0.31 | 0.0 | −1.14 | −0.64 | −0.21 | 0.0 | 0.80 | 1.00 | −0.21 | −0.64 | −1.33 | −0.21 | −0.48 | −0.64 | −0.70 |
| | W | 0.0 | 0.0 | 0.0 | 0.0 | 5.82 | 11.64 | 5.82 | 5.82 | 2.87 | 5.63 | 2.82 | 2.82 | 0.0 | 0.0 | 0.0 | 0.0 |
| R2 | N | 3.21 | 1.00 | 0.0 | −3.65 | −2.04 | −0.67 | 0.0 | 2.58 | 3.21 | −0.67 | −2.04 | −4.27 | −0.67 | −1.55 | −2.04 | −2.26 |
| | W | 0.69 | 1.38 | 0.69 | 0.69 | 1.81 | 3.62 | 1.81 | 1.81 | 0.88 | 1.75 | 0.88 | 0.88 | 0.0 | 0.0 | 0.0 | 0.0 |

Figure 3:
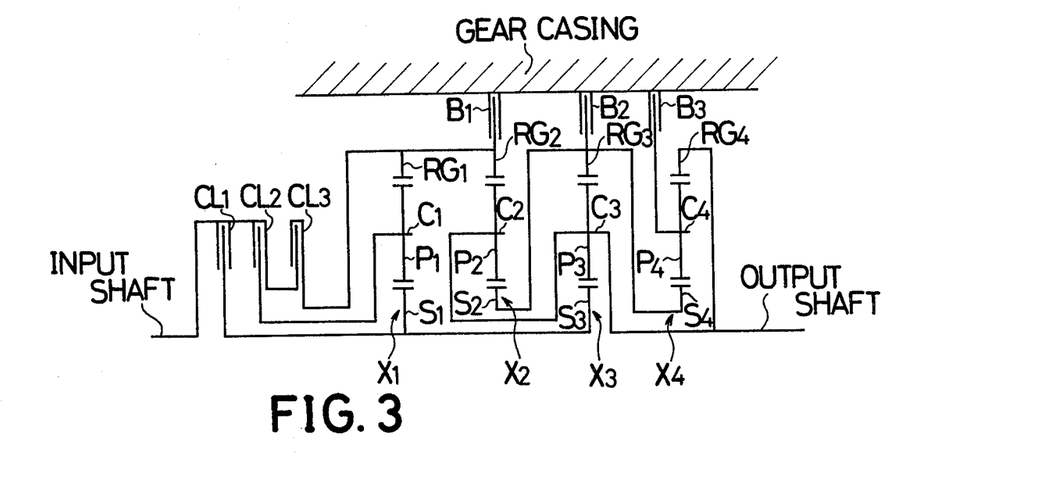
FIG. 3 is a schematic view similar to that of FIG. 1 showing however yet another embodiment of the present invention.

Referring now to FIG. 3, yet another embodiment of the present invention is disclosed wherein the fourth planetary gear set $X_4$ of the single-pinion type includes a fourth sun gear $S_4$ drivingly engaged with the third ring gear $RG_3$, while the fourth ring gear $RG_4$ is drivingly engaged with the output shaft. The fourth sun gear $S_4$ is thus capable of being locked to the gear casing when the second brake B2 is actuated, and a third brake B3 is interposed between the fourth carrier $C_4$ and the gear casing so as to be capable of locking the same thereto when the brake B3 is actuated.

TABLE 3A

| | CL1 | CL2 | CL3 | B1 | B2 | B3 | Reduction Gear Ratio |
|---|---|---|---|---|---|---|---|
| F1 | • | | | | | • | 8.83 |
| F2 | | | • | | | • | 4.36 |
| F3 | • | | | | • | | 3.82 |
| F4 | | | • | | • | | 2.21 |

TABLE 3A-continued

| | CL1 | CL2 | CL3 | B1 | B2 | B3 | Reduction Gear Ratio |
|---|---|---|---|---|---|---|---|
| F5 | | • | | | | • | 1.48 |
| F6 | | • | | | • | | 1.00 |
| R1 | • | | | | | • | −4.82 |
| R2 | | | • | • | | | −1.50 |

Within this embodiment, the radial ratio within each speed range is $I_4 = 0.562$ and Table 3A shows the relationship between the operation of the clutches and brakes with respect to the reduction gear ratios within each speed range, while Table 3B shows the relationship regarding the number of revolutions and the tangential forces of the elements of the planetary gear sets within each speed range.

TABLE 3B

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| | N | 1.00 | 0.49 | 0.27 | −0.83 | −0.20 | 0.11 | 0.27 | 0.59 | 1.00 | 0.11 | −0.20 | −0.98 | −0.20 | −0.00 | 0.11 | 0.52 |
| F1 | W | 0.0 | 0.0 | 0.0 | 0.0 | 0.0 | 0.0 | 0.0 | 0.0 | 2.82 | 5.63 | 2.82 | 2.82 | 5.01 | 10.02 | 5.01 | 5.01 |
| | N | 2.02 | 1.00 | 0.54 | −1.69 | −0.41 | 0.23 | 0.54 | 1.19 | 2.02 | 0.23 | −0.41 | −1.97 | −0.41 | −0.00 | 0.23 | 1.05 |
| F2 | W | 0.69 | 1.38 | 0.69 | 0.69 | 0.69 | 1.38 | 0.69 | 0.69 | 0.88 | 1.75 | 0.88 | 0.88 | 2.15 | 4.31 | 2.15 | 2.15 |
| | N | 1.00 | 0.58 | 0.39 | −0.69 | 0.0 | 0.26 | 0.39 | 0.49 | 1.00 | 0.26 | 0.0 | −0.81 | 0.0 | 0.17 | 0.26 | 0.43 |
| F3 | W | 0.0 | 0.0 | 0.0 | 0.0 | 0.0 | 0.00 | 0.00 | 0.00 | 2.82 | 5.63 | 2.82 | 2.82 | 0.0 | 0.0 | 0.0 | 0.0 |
| | N | 1.73 | 1.00 | 0.67 | −1.20 | 0.0 | 0.45 | 0.67 | 0.85 | 1.73 | 0.45 | 0.0 | −1.40 | 0.0 | 0.29 | 0.45 | 0.74 |
| F4 | W | 0.69 | 1.38 | 0.69 | 0.69 | 0.69 | 1.38 | 0.69 | 0.69 | 0.88 | 1.75 | 0.88 | 0.88 | 0.0 | 0.0 | 0.0 | 0.0 |
| | N | 2.57 | 1.49 | 1.00 | −1.79 | 0.0 | 0.67 | 1.00 | 1.26 | 2.57 | 0.67 | 0.0 | −2.09 | 0.0 | 0.43 | 0.67 | 1.11 |
| F5 | W | 0.0 | 0.0 | 0.0 | 0.0 | 1.00 | 2.00 | 1.00 | 1.00 | 0.0 | 0.00 | 0.00 | 0.00 | 0.0 | 0.0 | 0.0 | 0.0 |
| | N | 1.00 | 0.31 | 0.0 | −1.14 | −0.64 | −0.21 | 0.0 | 0.80 | 1.00 | −0.21 | −0.64 | −1.33 | −0.64 | −0.86 | −0.21 | 0.70 |
| R1 | W | 0.0 | 0.0 | 0.0 | 0.0 | 5.82 | 11.64 | 5.82 | 5.82 | 2.82 | 5.63 | 2.82 | 2.82 | 0.00 | 0.0 | 0.0 | 0.0 |
| | N | 3.21 | 1.00 | 0.0 | −3.65 | −2.04 | −0.67 | 0.0 | 2.58 | 3.21 | −0.67 | −2.04 | −4.27 | −2.04 | −1.16 | −0.67 | 2.26 |
| R2 | W | 0.69 | 1.38 | 0.69 | 0.69 | 1.81 | 3.62 | 1.81 | 1.81 | 0.88 | 1.75 | 0.88 | 0.88 | 0.00 | 0.0 | 0.0 | 0.0 |

Figure 4:
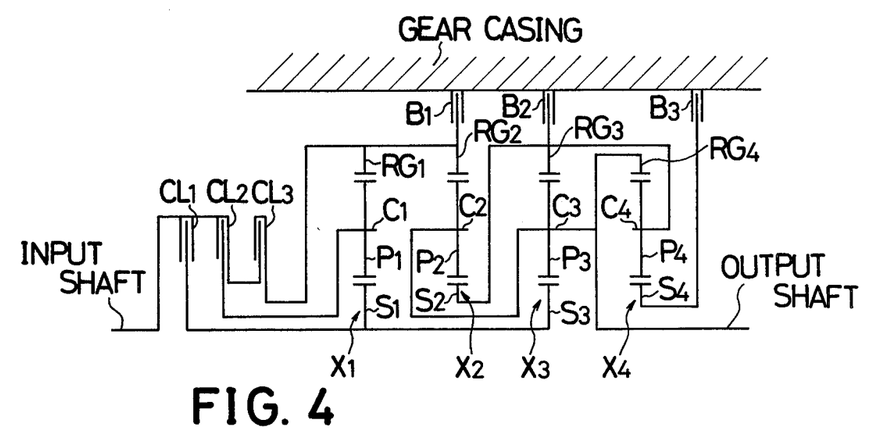
FIG. 4 is a schematic view similar to that of FIG. 1 showing however still another embodiment of the present invention.

A fourth embodiment of a speed change gear system constructed in accordance with the present invention is illustrated within FIG. 4 and is seen to include a fourth planetary gear set $X_4$ of the single-pinion type interposed between the third planetary gear set $X_3$ and the output shaft, the fourth carrier $C_4$ being drivingly engaged with the third ring gear $RG_3$ and the second sun gear $S_2$ so as to be capable of being locked to the gear casing when the second brake B2 is actuated. The third brake B3 is interposed between the fourth sun gear S4 and the gear casing so as to be capable of locking the same thereto when the brake B3 is actuated, and the fourth ring gear $RG_4$ is drivingly engaged with the third carrier $C_3$ as well as the output shaft.

TABLE 4A

| | CL1 | CL2 | CL3 | B1 | B2 | B3 | Reduction Gear Ratio |
|---|---|---|---|---|---|---|---|
| F1 | • | | | | | • | 3.82 |
| F2 | • | | | | • | | 2.21 |
| F3 | • | | | | | • | 2.01 |
| F4 | | | • | | • | | 1.48 |
| F5 | | • | | | | • | 1.44 |
| F6 | | • | | | • | | 1.17 |

TABLE 4A-continued

| | CL1 | CL2 | CL3 | B1 | B2 | B3 | Reduction Gear Ratio |
|---|---|---|---|---|---|---|---|
| F7 | • | | | | • | | 1.00 |
| R1 | | | • | | | • | −4.82 |

Within this embodiment, the radial ratio within each speed range is $I_4 = 0.562$, and Table 4A shows the relationship between the operation of the clutches and brakes with respect to the reduction gear ratio within each speed range, while Table 4B shows the relationship regarding the number of revolutions and the tangential forces of all of the elements of the planetary gear sets within each speed range.

TABLE 5A-continued

| | CL1 | CL2 | CL3 | B1 | B2 | B3 | Reduction Gear Ratio |
|---|---|---|---|---|---|---|---|
| R2 | | | • | | • | | −1.50 |

Figure 5:
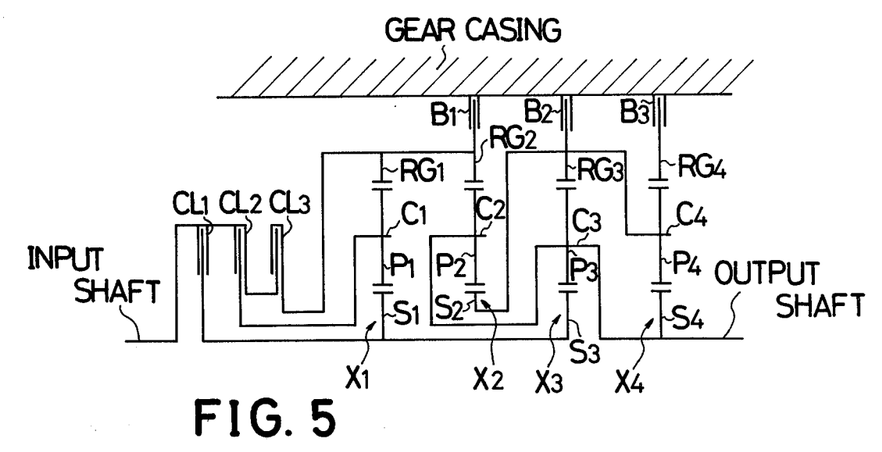
FIG. 5 is a schematic view similar to that of FIG. 1 showing yet still another embodiment of the present invention.

Within this embodiment, the radial ratio within each speed range is $I_4 = 0.562$, and Table 5A shows the relationship between the operation of the clutches and brakes with respect to the reduction gear ratio within each speed range, while Table 5B shows the relationship regarding the number of revolutions and the tangential forces of the elements within the planetary gear sets within each speed range.

TABLE 5B

| B | | X1 | | | | X2 | | | | X3 | | | | X4 | | |
|---|---|---|---|---|---|---|---|---|---|---|---|---|---|---|---|---|
| A | | S1 | C1 | RG1 | P1 | S2 | C2 | RG2 | P2 | S3 | C3 | RG3 | P3 | S4 | C4 | RG4 | P4 |
| F1 | N | 1.00 | 0.58 | 0.39 | −0.69 | 0.00 | 0.26 | 0.39 | 0.49 | 1.00 | 0.26 | 0.00 | −0.81 | 0.26 | 0.00 | −0.15 | −0.67 |
| | W | 0.0 | 0.0 | 0.0 | 0.0 | 0.0 | 0.00 | 0.0 | 0.0 | 2.82 | 5.63 | 2.82 | 2.82 | 0.00 | 0.00 | 0.00 | 0.00 |
| F2 | N | 1.00 | 0.63 | 0.47 | −0.61 | 0.13 | 0.36 | 0.47 | 0.43 | 1.00 | 0.36 | 0.13 | −0.71 | 0.36 | 0.13 | 0.0 | −0.59 |
| | W | 0.0 | 0.0 | 0.0 | 0.0 | 0.0 | 0.00 | 0.0 | 0.0 | 2.82 | 5.63 | 2.82 | 2.82 | 1.80 | 3.61 | 1.80 | 1.80 |
| F3 | N | 1.73 | 1.00 | 0.67 | −1.20 | 0.00 | 0.45 | 0.67 | 0.85 | 1.73 | 0.45 | 0.00 | −1.40 | 0.45 | 0.00 | −0.25 | −1.16 |
| | W | 0.69 | 1.38 | 0.69 | 0.69 | 0.69 | 1.38 | 0.69 | 0.69 | 0.88 | 1.75 | 0.88 | 0.88 | 0.00 | 0.00 | 0.00 | 0.00 |
| F4 | N | 1.58 | 1.00 | 0.74 | −0.96 | 0.20 | 0.56 | 0.74 | 0.68 | 1.58 | 0.56 | 0.20 | −1.12 | 0.56 | 0.20 | 0.0 | −0.93 |
| | W | 0.69 | 1.38 | 0.69 | 0.69 | 0.69 | 1.38 | 0.69 | 0.69 | 0.88 | 1.75 | 0.88 | 0.88 | 0.77 | 1.55 | 0.77 | 0.77 |
| F5 | N | 2.57 | 1.49 | 1.00 | −1.79 | 0.0 | 0.67 | 1.00 | 1.26 | 2.57 | 0.67 | 0.0 | −2.09 | 0.67 | 0.00 | −0.38 | −1.73 |
| | W | 0.0 | 0.0 | 0.0 | 0.0 | 1.00 | 2.00 | 1.00 | 1.00 | 0.0 | 0.00 | 0.00 | 0.00 | 0.0 | 0.00 | 0.00 | 0.00 |
| F6 | N | 2.14 | 1.35 | 1.00 | −1.30 | 0.27 | 0.76 | 1.00 | 0.92 | 2.14 | 0.76 | 0.27 | −1.52 | 0.76 | 0.27 | 0.0 | −1.25 |
| | W | 0.0 | 0.0 | 0.0 | 0.0 | 1.00 | 2.00 | 1.00 | 1.00 | 0.0 | 0.00 | 0.00 | 0.00 | 0.31 | 0.62 | 0.31 | 0.31 |
| R1 | N | 1.00 | 0.31 | 0.0 | −1.14 | −0.64 | −0.21 | 0.0 | 0.80 | 1.00 | −0.21 | −0.64 | −1.33 | −0.21 | −0.64 | −0.88 | −1.10 |
| | W | 0.0 | 0.0 | 0.0 | 0.0 | 5.82 | 11.64 | 5.82 | 5.82 | 2.82 | 5.63 | 2.82 | 2.82 | 0.0 | 0.00 | 0.0 | 0.0 |
| R2 | N | 3.21 | 1.00 | 0.0 | −3.65 | −2.04 | −0.67 | 0.0 | 2.58 | 3.21 | −0.67 | −2.04 | −4.27 | −0.67 | −204 | −2.82 | −3.53 |
| | W | 0.69 | 1.38 | 0.69 | 0.69 | 1.81 | 3.62 | 1.81 | 1.81 | 0.88 | 1.75 | 0.88 | 0.88 | 0.00 | 0.00 | 0.00 | 0.00 | sets within each speed range.

TABLE 4B

| B | | X1 | | | | X2 | | | | X3 | | | | X4 | | |
|---|---|---|---|---|---|---|---|---|---|---|---|---|---|---|---|---|
| A | | S1 | C1 | RG1 | P1 | S2 | C2 | RG2 | P2 | S3 | C3 | RG3 | P3 | S4 | C4 | RG4 | P4 |
| F1 | N | 1.00 | 0.58 | 0.39 | −0.69 | 0.0 | 0.26 | 0.39 | 0.49 | 1.00 | 0.26 | 0.0 | −0.81 | −0.47 | 0.0 | 0.26 | 1.20 |
| | W | 0.0 | 0.0 | 0.0 | 0.0 | 0.0 | 0.00 | 0.0 | 0.0 | 2.82 | 5.63 | 2.82 | 2.82 | 0.0 | 0.00 | 0.00 | 0.00 |
| F2 | N | 1.73 | 1.00 | 0.67 | −1.20 | 0.0 | 0.45 | 0.67 | 0.85 | 1.73 | 0.45 | 0.0 | −1.40 | −0.81 | 0.0 | 0.45 | 2.07 |
| | W | 0.69 | 1.38 | 0.69 | 0.69 | 0.69 | 1.38 | 0.69 | 0.69 | 0.88 | 1.75 | 0.88 | 0.88 | 0.0 | 0.00 | 0.00 | 0.00 |
| F3 | N | 1.00 | 0.71 | 0.58 | −0.47 | 0.32 | 0.50 | 0.58 | 0.34 | 1.00 | 0.50 | 0.32 | −0.55 | 0.0 | 0.32 | 0.50 | 0.82 |
| | W | 0.0 | 0.0 | 0.0 | 0.0 | 0.0 | 0.00 | 0.00 | 0.00 | 2.82 | 5.63 | 2.82 | 2.82 | 1.80 | 3.61 | 1.80 | 1.80 |
| F4 | N | 2.57 | 1.49 | 1.00 | −1.79 | 0.0 | 0.67 | 1.00 | 1.26 | 2.57 | 0.67 | 0.0 | −2.09 | −1.20 | 0.0 | 0.67 | 3.08 |
| | W | 0.0 | 0.0 | 0.0 | 0.0 | 1.00 | 2.00 | 1.00 | 1.00 | 0.0 | 0.00 | 0.00 | 0.00 | 0.0 | 0.00 | 0.00 | 0.00 |
| F5 | N | 1.40 | 1.00 | 0.82 | −0.66 | 0.45 | 0.70 | 0.82 | 0.47 | 1.40 | 0.70 | 0.45 | −0.78 | 0.0 | 0.45 | 0.70 | 1.14 |
| | W | 0.69 | 1.38 | 0.69 | 0.69 | 0.69 | 1.38 | 0.69 | 0.69 | 0.88 | 1.75 | 0.88 | 0.88 | 0.77 | 1.55 | 0.77 | 0.77 |
| F6 | N | 1.71 | 1.22 | 1.00 | −0.81 | 0.55 | 0.85 | 1.00 | 0.57 | 1.71 | 0.85 | 0.55 | −0.95 | 0.0 | 0.55 | 0.85 | 1.40 |
| | W | 0.0 | 0.0 | 0.0 | 0.0 | 1.00 | 2.00 | 1.00 | 1.00 | 0.0 | 0.00 | 0.00 | 0.00 | 0.31 | 0.62 | 0.31 | 0.31 |
| R1 | N | 1.00 | 0.31 | 0.0 | −1.14 | −0.64 | −0.21 | 0.0 | 0.80 | 1.00 | −0.21 | −0.64 | −1.33 | −1.40 | −0.64 | −0.21 | 1.96 |
| | W | 0.0 | 0.0 | 0.0 | 0.0 | 5.82 | 11.64 | 5.82 | 5.82 | 2.82 | 5.63 | 2.82 | 2.82 | 0.0 | 0.00 | 0.00 | 0.00 |

Referring now to FIG. 5, a further embodiment of the invention is disclosed wherein the fourth planetary gear set $X_4$, of the single-pinion type is interposed between the third planetary gear set $X_3$ and the output shaft and wherein further the fourth carrier $C_4$ is drivingly engaged with the third ring gear $RG_3$ and the second sun gear $S_2$ so as to be capable of being locked to the gear casing when the second brake B2 is actuated. The third brake B3 is is interposed between the fourth ring gear $RG_4$ and the gear casing so as to be capable of locking the same thereto when the brake B3 is in fact actuated, and the fourth sun gear $S_4$ is drivingly engaged with the output shaft.

TABLE 5A

| | CL1 | CL2 | CL3 | B1 | B2 | B3 | Reduction Gear Ratio |
|---|---|---|---|---|---|---|---|
| F1 | • | | | | • | | 3.82 |
| F2 | • | | | | | • | 2.80 |
| F3 | | • | | | • | | 2.21 |
| F4 | | • | | | | • | 1.78 |
| F5 | | | • | | • | | 1.48 |
| F6 | | | • | | | • | 1.31 |
| F7 | • | | | | | | 1.00 |
| R1 | | | • | | | • | −4.82 |

Figure 6:
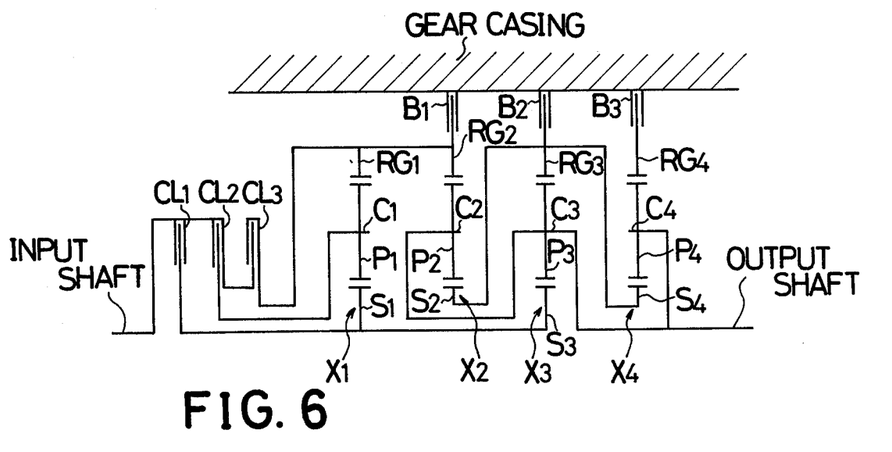
FIG. 6 is a schematic view similar to that of FIG. 1 showing however a further embodiment of the present invention.

Turning now to the embodiment illustrated within FIG. 6, the fourth planetary gear set $X_4$ of the single-pinion type is seen to be interposed between the third planetary gear set $X_3$ and the output shaft and is seen to include the fourth sun gear $S_4$ drivingly engaged with the third ring gear $RG_3$ and the second sun gear $S_2$ so as to be capable of being locked therewith to the gear casing when the second brake B2 is actuated. The third brake B3 is interposed between the fourth ring gear $RG_4$ and the casing so as to be capable of locking the fourth ring gear $RG_4$ thereto when the brake B3 is actuated, and the fourth carrier $C_4$ is drivingly engaged with the output shaft.

TABLE 6A

| | CL1 | CL2 | CL3 | B1 | B2 | B3 | Reduction Gear Ratio |
|---|---|---|---|---|---|---|---|
| F1 | • | | | | • | | 3.82 |
| F2 | | • | | | • | | 2.21 |
| F3 | | | • | | • | | 1.48 |
| F4 | • | | | | | | 1.00 |
| R1 | • | | | | | • | −5.45 |
| R2 | | • | | | | • | −4.82 |
| R3 | | | • | | | • | −1.77 |
| R4 | | | • | | • | | −1.50 |

Within this embodiment, the radial ratio within each speed range is $I_4 = 0.437$ and Table 6A shows the relationship between the operation of the clutches and brakes with respect to the reduction gear ratio within each speed range, while Table 6B shows the relationship regarding the number of revolutions and the tangential forces of the elements of the planetary gear sets within each speed range.

TABLE 7B

| A | B | X1 | | | | X2 | | | | X3 | | | | X4 | | | |
|---|---|----|----|-----|-----|----|----|-----|----|----|----|-----|-----|----|----|-----|-----|
|   |   | S1 | C1 | RG1 | P1  | S2 | C2 | RG2 | P2 | S3 | C3 | RG3 | P3  | S4 | C4 | RG4 | R4  |
| F1 | N | 1.00 | 0.58 | 0.39 | −0.69 | 0.0 | 0.26 | 0.39 | 0.49 | 1.00 | 0.26 | 0.0 | −0.81 | 0.73 | 0.26 | 0.0 | −1.20 |
|    | W | 0.0  | 0.0  | 0.0  | 0.0   | 0.0 | 0.00 | 0.00 | 0.00 | 2.82 | 5.63 | 2.82 | 2.82 | 0.0 | 0.0 | 0.0 | 0.0 |
| F2 | N | 1.73 | 1.00 | 0.67 | −1.20 | 0.0 | 0.45 | 0.67 | 0.85 | 1.73 | 0.45 | 0.0 | −1.40 | 1.26 | 0.45 | 0.0 | −2.07 |
|    | W | 0.69 | 1.38 | 0.69 | 0.69  | 0.69 | 1.38 | 0.69 | 0.69 | 0.88 | 1.75 | 0.88 | 0.88 | 0.0 | 0.0 | 0.0 | 0.0 |
| F3 | N | 2.57 | 1.49 | 1.00 | −1.79 | 0.0 | 0.67 | 1.00 | 1.26 | 2.57 | 0.67 | 0.0 | −2.09 | 1.87 | 0.67 | 0.0 | −3.08 |
|    | W | 0.0  | 0.0  | 0.0  | 0.0   | 1.00 | 2.00 | 1.00 | 1.00 | 0.0 | 0.00 | 0.00 | 0.00 | 0.0 | 0.0 | 0.0 | 0.0 |
| F5 | N | −0.80 | 0.44 | 1.00 | 2.05 | 2.15 | 1.37 | 1.00 | −1.45 | −0.80 | 1.37 | 2.15 | 2.39 | 0.0 | 1.37 | 2.15 | 3.53 |
|    | W | 0.0  | 0.0  | 0.0  | 0.0   | 1.00 | 2.00 | 1.00 | 1.00 | 0.0 | 0.00 | 0.00 | 0.00 | 0.48 | 0.97 | 0.48 | 0.48 |
| R1 | N | 1.00 | 0.31 | 0.0  | −1.14 | −0.64 | −0.21 | 0.0 | 0.80 | 1.00 | −0.21 | −0.64 | −1.33 | 0.56 | −0.21 | −0.64 | −1.96 |
|    | W | 0.0  | 0.0  | 0.0  | 0.0   | 5.82 | 11.64 | 5.82 | 5.82 | 2.82 | 5.63 | 2.82 | 2.82 | 0.0 | 0.0 | 0.0 | 0.0 |
| R2 | N | 3.21 | 1.00 | 0.0  | −3.65 | −2.04 | −0.67 | 0.0 | 2.58 | 3.21 | −0.67 | −2.04 | −4.27 | 1.78 | −0.67 | −2.04 | −6.29 |
|    | W | 0.69 | 1.38 | 0.69 | 0.69  | 1.81 | 3.62 | 1.81 | 1.81 | 0.88 | 1.75 | 0.88 | 0.88 | 0.0 | 0.0 | 0.0 | 0.0 |
| R3 | N | 1.00 | −0.55 | −1.25 | −2.55 | −2.68 | −1.71 | −1.25 | 1.81 | 1.00 | −1.71 | −2.68 | −2.99 | 0.0 | −1.71 | −2.68 | −4.40 |
|    | W | 0.0  | 0.0  | 0.0  | 0.0   | 0.00 | 0.00 | 0.0 | 0.0 | 2.82 | 5.63 | 2.82 | 2.82 | 2.82 | 5.63 | 2.82 | 2.82 |

Figure 8:
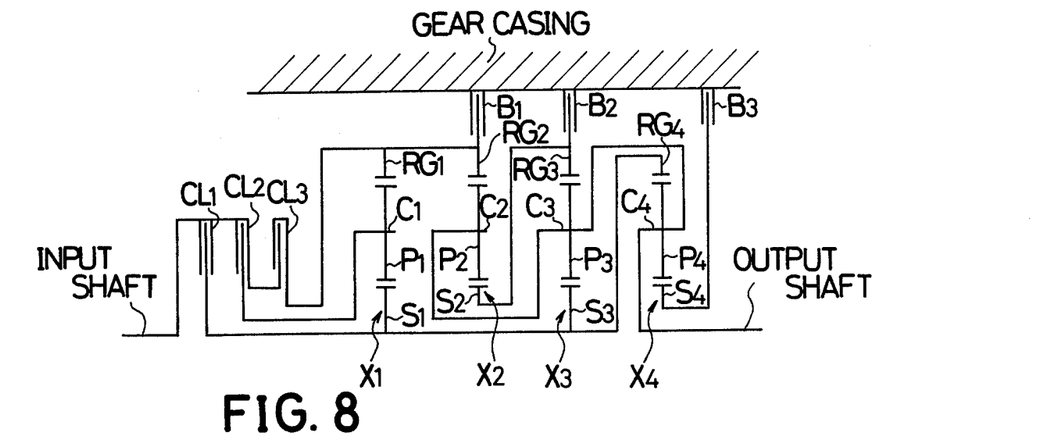
FIG. 8 is a schematic view similar to that of FIG. 1 showing however a still further embodiment of the present invention.

Referring now to FIG. 8 still another embodiment of the present invention is disclosed wherein the fourth planetary gear set $X_4$ of the single-pinion type is interposed between the third planetary gear set $X_3$ and the

TABLE 6B

| A | B | X1 | | | | X2 | | | | X3 | | | | X4 | | | |
|---|---|----|----|-----|-----|----|----|-----|----|----|----|-----|-----|----|----|-----|-----|
|   |   | S1 | C1 | RG1 | P1  | S2 | C2 | RG2 | P2 | S3 | C3 | RG3 | P3  | S4 | C4 | RG4 | P4  |
| F1 | N | 1.00 | 0.58 | 0.39 | −0.69 | 0.0 | 0.26 | 0.39 | 0.49 | 1.00 | 0.26 | 0.0 | −0.81 | 0.0 | 0.26 | 0.38 | 0.41 |
|    | W | 0.0  | 0.0  | 0.0  | 0.0   | 0.0 | 0.00 | 0.00 | 0.00 | 2.82 | 5.63 | 2.82 | 2.82 | 0.0 | 0.0 | 0.0 | 0.0 |
| F2 | N | 1.73 | 1.00 | 0.67 | −1.20 | 0.0 | 0.45 | 0.67 | 0.85 | 1.73 | 0.45 | 0.0 | −1.40 | 0.0 | 0.45 | 0.65 | 0.70 |
|    | W | 0.69 | 1.38 | 0.69 | 0.69  | 0.69 | 1.38 | 0.69 | 0.69 | 0.88 | 1.75 | 0.88 | 0.88 | 0.0 | 0.0 | 0.0 | 0.0 |
| F3 | N | 2.57 | 1.49 | 1.00 | −1.79 | 0.0 | 0.67 | 1.00 | 1.26 | 2.57 | 0.67 | 0.0 | −2.09 | 0.0 | 0.67 | 0.97 | 1.05 |
|    | W | 0.0  | 0.0  | 0.0  | 0.0   | 1.00 | 2.00 | 1.00 | 1.00 | 0.0 | 0.00 | 0.00 | 0.00 | 0.0 | 0.0 | 0.0 | 0.0 |
| R1 | N | 1.00 | 0.32 | 0.02 | −1.11 | −0.60 | −0.18 | 0.02 | 0.79 | 1.00 | −0.18 | −0.60 | −1.30 | −0.60 | −0.18 | 0.00 | 0.65 |
|    | W | 0.0  | 0.0  | 0.0  | 0.0   | 0.0 | 0.00 | 0.00 | 0.00 | 2.82 | 5.63 | 2.82 | 2.82 | 6.45 | 12.89 | 6.45 | 6.45 |
| R2 | N | 1.00 | 0.31 | 0.0  | −1.14 | −0.64 | −0.21 | 0.0 | 0.80 | 1.00 | −0.21 | −0.64 | −1.33 | −0.64 | −0.21 | −0.02 | 0.67 |
|    | W | 0.0  | 0.0  | 0.0  | 0.0   | 5.82 | 11.64 | 5.82 | 5.82 | 2.82 | 5.63 | 2.82 | 2.82 | 0.00 | 0.0 | 0.0 | 0.0 |
| R3 | N | 3.08 | 1.00 | 0.06 | −3.43 | −1.86 | −0.57 | 0.06 | 2.43 | 3.08 | −0.57 | −1.86 | −4.01 | −1.86 | −0.57 | 0.0 | 2.01 |
|    | W | 0.69 | 1.38 | 0.69 | 0.69  | 0.69 | 1.38 | 0.69 | 0.69 | 0.88 | 1.75 | 0.88 | 0.88 | 2.77 | 5.54 | 2.77 | 2.77 |
| R4 | N | 3.21 | 1.00 | 0.0  | −3.65 | −2.04 | −0.67 | 0.0 | 2.58 | 3.21 | −0.67 | −2.04 | −4.27 | −2.04 | −0.67 | −0.06 | 2.14 |
|    | W | 0.69 | 1.38 | 0.69 | 0.69  | 1.81 | 3.62 | 1.81 | 1.81 | 0.88 | 1.75 | 0.88 | 0.88 | 0.00 | 0.0 | 0.0 | 0.0 |

Figure 7:
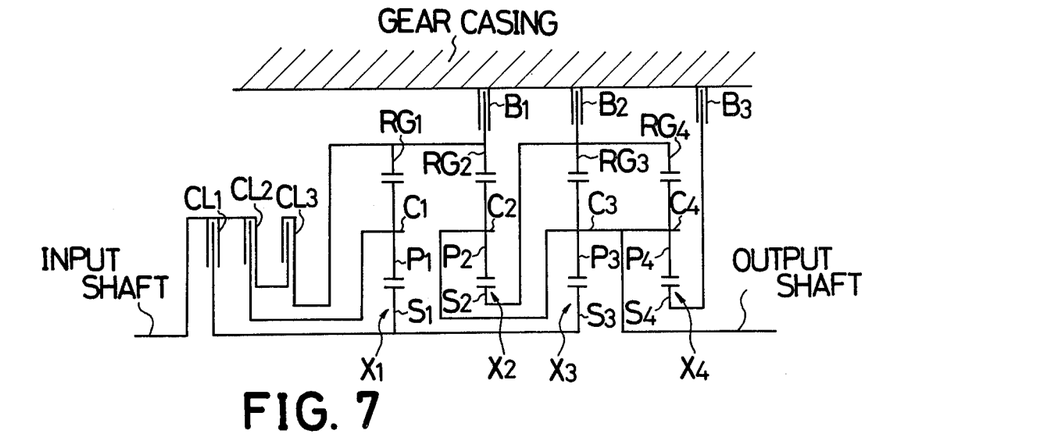
FIG. 7 is a schematic view similar to that of FIG. 1 showing however a yet further embodiment of the present invention.

Referring now to the embodiment of the invention illustrated within FIG. 7, the fourth planetary gear set $X_4$ of the single-pinion type is interposed between the third planetary gear set $X_3$ and the output shaft and includes the fourth ring gear $RG_4$ drivingly engaged with the third ring gear $RG_3$ and the second sun gear $S_2$ so as to be capable of being locked therewith to the gear casing when the second brake B2 is actuated. The third brake B3 is interposed between the fourth sun gear $S_4$ and the casing so as to be capable of locking the fourth sun gear $S_4$ thereto when the brake B3 is actuated, and the fourth carrier $C_4$ is drivingly engaged with the output shaft.

output shaft and is seen to include the fourth ring gear $RG_4$ drivingly engaged with the first and third sun gears $S_1$ and $S_3$, and the fourth sun gear $S_4$ is operatively connected to the third brake B3. Consequently, as the third brake B3 is interposed between the fourth sun gear $S_4$ and the gear casing, such is capable of locking the fourth sun gear $S_4$ to the casing when the brake B3 is actuated, the fourth carrier $C_4$ being drivingly engaged with the output shaft.

TABLE 7A

| | CL1 | CL2 | CL3 | B1 | B2 | B3 | Reduction Gear Ratio |
|---|---|---|---|---|---|---|---|
| F1 | · | | | | | · | 3.82 |
| F2 | · | | | | · | | 2.21 |
| F3 | · | | | | | | 1.48 |
| F4 | | | | | | | 1.00 |
| F5 | | | | | | | 0.73 |
| R1 | | | | | | | −4.82 |
| R2 | | | | | | | −1.50 |
| R3 | | | | | | | −0.58 |

Within this embodiment, the radial ratio within each speed range is $I_4 = 0.562$, and Table 7A shows the relationship between the operation of the clutches and brakes with respect to the reduction gear ratio within

TABLE 8A

| | CL1 | CL2 | CL3 | B1 | B2 | B3 | Reduction Gear Ratio |
|---|---|---|---|---|---|---|---|
| F1 | · | | | | | · | 3.82 |
| F2 | | · | | | · | | 2.21 |
| F3 | · | | | | · | | 1.28 |
| F4 | | · | | | · | | 1.12 |
| F5 | | | · | | · | | 1.05 |
| F6 | · | | · | | | | 1.00 |
| R1 | · | | | · | | | −4.82 |

Within this embodiment, the radial ratio within each speed range is $I_4 = 0.280$, and Table 8A shows the relationship between the operation of the clutches and brakes and the reduction gear ratio within each speed range, while Table 8B shows the relationship regarding the number of revolutions and the tangential forces of all the elements of the planetary gear sets within each speed range.

TABLE 8B

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | 1.00 | 0.58 | 0.39 | −0.69 | 0.0 | 0.26 | 0.39 | 0.49 | 1.00 | 0.26 | 0.0 | −0.81 | −2.37 | 0.26 | 1.00 | 2.05 |
| | W | 0.0 | 0.0 | 0.0 | 0.0 | 0.00 | 0.00 | 0.00 | 0.00 | 2.82 | 5.63 | 2.82 | 2.82 | 0.0 | 0.00 | 0.00 | 0.00 |
| F2 | N | 1.73 | 1.00 | 0.67 | −1.20 | 0.0 | 0.45 | 0.67 | 0.85 | 1.73 | 0.45 | 0.0 | −1.40 | −4.10 | 0.45 | 1.73 | 3.54 |
| | W | 0.69 | 1.38 | 0.69 | 0.69 | 0.69 | 1.38 | 0.69 | 0.69 | 0.88 | 1.75 | 0.88 | 0.88 | 0.0 | 0.0 | 0.0 | 0.0 |
| F3 | N | 1.00 | 0.88 | 0.82 | −0.21 | 0.70 | 0.78 | 0.82 | 0.15 | 1.00 | 0.78 | 0.70 | −0.24 | 0.0 | 0.78 | 1.00 | 0.61 |
| | W | 0.0 | 0.0 | 0.0 | 0.0 | 0.00 | 0.00 | 0.00 | 0.00 | 0.00 | 0.00 | 0.00 | 0.00 | 1.00 | 2.00 | 1.00 | 1.00 |
| F4 | N | 1.14 | 1.00 | 0.94 | −0.24 | 0.80 | 0.89 | 0.94 | 0.17 | 1.14 | 0.89 | 0.80 | −0.28 | 0.0 | 0.89 | 1.14 | 0.69 |
| | W | 0.69 | 1.38 | 0.69 | 0.69 | 0.69 | 1.38 | 0.69 | 0.69 | 0.33 | 0.67 | 0.33 | 0.33 | 0.43 | 0.86 | 0.43 | 0.43 |
| F5 | N | 1.22 | 1.07 | 1.00 | −0.25 | 0.86 | 0.95 | 1.00 | 0.18 | 1.22 | 0.95 | 0.86 | −0.29 | 0.00 | 0.95 | 1.22 | 0.74 |
| | W | 0.0 | 0.0 | 0.0 | 0.0 | 1.00 | 2.00 | 1.00 | 1.00 | 0.48 | 0.97 | 0.48 | 0.48 | 0.17 | 0.34 | 0.17 | 0.17 |
| R1 | N | 1.00 | 0.31 | 0.0 | −1.14 | −0.64 | −0.21 | 0.0 | 0.80 | 1.00 | −0.21 | −0.64 | −1.33 | −4.52 | −0.21 | 1.00 | 3.35 |
| | W | 0.0 | 0.0 | 0.0 | 0.0 | 5.82 | 11.64 | 5.82 | 5.82 | 2.82 | 5.63 | 2.82 | 2.82 | 0.0 | 0.00 | 0.00 | 0.00 |

Figure 9:
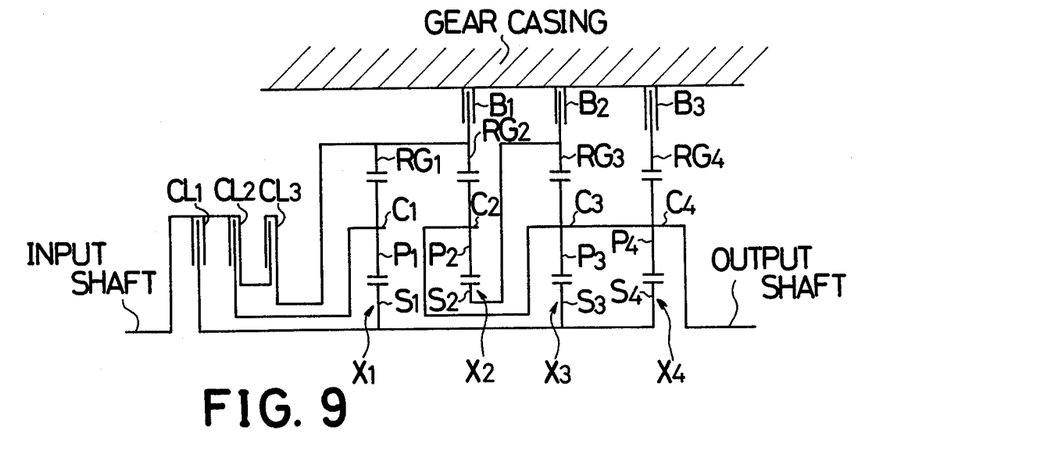
FIG. 9 is a schematic view similar to that of FIG. 1 showing however a yet still further embodiment of the present invention.

Turning now to FIG. 9, a still further embodiment of the present invention is illustrated wherein the fourth planetary gear set $X_4$ of the single-pinion type is interposed between the third planetary gear set $X_3$ and the output shaft, and the fourth sun gear $S_4$ is drivingly engaged with the first and third sun gears $S_1$ and $S_3$. The third brake B3 is interposed between the fourth ring gear $RG_4$ and the gear casing so as to be capable of locking the fourth ring gear $RG_4$ thereto when the brake B3 is actuated, and the fourth carrier $C_4$ is drivingly engaged with the output shaft.

TABLE 9A

| | CL1 | CL2 | CL3 | B1 | B2 | B3 | Reduction Gear Ratio |
|---|---|---|---|---|---|---|---|
| F1 | • | | | | | • | 4.57 |
| F2 | • | | | | • | | 3.82 |
| F3 | • | | | | | • | 2.53 |
| F4 | • | | | | • | | 2.21 |
| F5 | | • | | | | • | 1.61 |
| F6 | | • | | | • | | 1.48 |
| F7 | • | • | | | | | 1.00 |
| R1 | | | • | • | | | −4.82 |
| R2 | | | • | | | • | −1.50 |

Within this embodiment, the radial ratio within each speed range is $I_4 = 0.280$ and Table 9A shows the relationship between the operation of the clutches and brakes and the reduction gear ratio within each speed range, while Table 9B shows the relationship regarding the number of revolutions and the tangential forces of all of the elements of planetary gear sets within each speed range.

TABLE 9B

| A | B | X1 | | | | X2 | | | | X3 | | | | X4 | | | |
|---|---|---|---|---|---|---|---|---|---|---|---|---|---|---|---|---|---|
| | | S1 | C1 | RG1 | P1 | S2 | C2 | RG2 | P2 | S3 | C3 | RG3 | P3 | S4 | C4 | RG4 | P4 |
| F1 | N | 1.00 | 0.55 | 0.35 | −0.74 | −0.06 | 0.22 | 0.35 | 0.52 | 1.00 | 0.22 | −0.06 | −0.86 | 1.00 | 0.22 | 0.0 | −0.61 |
| | W | 0.0 | 0.0 | 0.0 | 0.0 | 0.00 | 0.00 | 0.00 | 0.00 | 0.0 | 0.00 | 0.00 | 0.00 | 3.57 | 7.14 | 3.57 | 3.57 |
| F2 | N | 1.00 | 0.58 | 0.39 | −0.69 | 0.0 | 0.26 | 0.39 | 0.49 | 1.00 | 0.26 | 0.0 | −0.81 | 1.00 | 0.26 | 0.06 | −0.57 |
| | W | 0.0 | 0.0 | 0.0 | 0.0 | 0.0 | 0.00 | 0.00 | 0.00 | 2.82 | 5.63 | 2.82 | 2.82 | 0.00 | 0.0 | 0.0 | 0.0 |
| F3 | N | 1.80 | 1.00 | 0.64 | −1.33 | −0.11 | 0.39 | 0.64 | 0.94 | 1.80 | 0.39 | −0.11 | −1.55 | 1.80 | 0.39 | 0.0 | −1.10 |
| | W | 0.69 | 1.38 | 0.69 | 0.69 | 0.69 | 1.38 | 0.69 | 0.69 | 0.33 | 0.67 | 0.33 | 0.33 | 1.53 | 3.07 | 1.53 | 1.53 |
| F4 | N | 1.73 | 1.00 | 0.67 | −1.20 | 0.0 | 0.45 | 0.67 | 0.85 | 1.73 | 0.45 | 0.0 | −1.40 | 1.73 | 0.45 | 0.10 | −0.99 |
| | W | 0.69 | 1.38 | 0.69 | 0.69 | 0.69 | 1.38 | 0.69 | 0.69 | 0.88 | 1.75 | 0.88 | 0.88 | 0.00 | 0.0 | 0.0 | 0.0 |
| F5 | N | 2.83 | 1.57 | 1.00 | −2.08 | −0.17 | 0.62 | 1.00 | 1.47 | 2.83 | 0.62 | −0.17 | −2.44 | 2.83 | 0.62 | 0.0 | −1.72 |
| | W | 0.0 | 0.0 | 0.0 | 0.0 | 1.00 | 2.00 | 1.00 | 1.00 | 0.48 | 0.97 | 0.48 | 0.48 | 0.61 | 1.23 | 0.61 | 0.61 |
| F6 | N | 2.57 | 1.49 | 1.00 | −1.79 | 0.0 | 0.67 | 1.00 | 1.26 | 2.57 | 0.67 | 0.00 | −2.09 | 2.57 | 0.67 | 0.14 | −1.48 |
| | W | 0.0 | 0.0 | 0.0 | 0.0 | 1.00 | 2.00 | 1.00 | 1.00 | 0.00 | 0.00 | 0.00 | 0.00 | 0.00 | 0.00 | 0.00 | 0.00 |
| R1 | N | 1.00 | 0.31 | 0.0 | −1.14 | −0.64 | −0.21 | 0.0 | 0.80 | 1.00 | −0.21 | −0.64 | −1.33 | 1.00 | −0.21 | −0.55 | −0.94 |
| | W | 0.0 | 0.0 | 0.0 | 0.0 | 5.82 | 11.64 | 5.82 | 5.82 | 2.82 | 5.63 | 2.82 | 2.82 | 0.0 | 0.00 | 0.00 | 0.00 |
| R2 | N | 3.21 | 1.00 | 0.0 | −3.65 | −2.04 | −0.67 | 0.0 | 2.58 | 3.21 | −0.67 | −2.04 | −4.27 | 3.21 | −0.67 | −1.75 | −3.02 |
| | W | 0.69 | 1.38 | 0.69 | 0.69 | 1.81 | 3.62 | 1.81 | 1.81 | 0.88 | 1.75 | 0.88 | 0.88 | 0.00 | 0.00 | 0.00 | 0.00 |

Obviously, many modifications and variations of the present invention are possible in light of the above teachings. It is therefore to be understood that within the scope of the appended claims, the present invention may be practiced otherwise than as specifically described herein.

What is claimed as new and desired to be secured by letters patent of the United States is:

1. A speed change gear system comprising:
    an input shaft;
    an output shaft;
    a first planetary gear set including a first sun gear, a first planetary gear meshed with said first sun gear, a first ring gear meshed with said first planetary gear, and a first carrier rotatably supporting said first planetary gear;
    a second planetary gear set including a second sun gear, a second planetary gear meshed with said second sun gear, a second ring gear meshed with said second planetary gear and drivingly connected to said first ring gear, and a second carrier rotatably supporting said second planetary gear;
    a third planetary gear set including a third sun gear drivingly connected to said first sun gear, a third planetary gear meshed with said third sun gear, a third ring gear meshed with said third planetary gear and drivingly connected to said second sun gear, and a third carrier rotatably supporting said third planetary gear and drivingly connected to said second carrier and said output shaft;
    clutch means for selectively coupling said first and third sun gears, said first carrier, and said first and second ring gear to said input shaft; and
    brake means actuatable for selective engagement with said first and second ring gears, said second sun gear and said third ring gear.

2. A speed change gear system in accordance with claim 1 wherein said clutch means includes a first clutch for connecting said first and third sun gears with said input shaft, a second clutch for connecting said first carrier with said input shaft, and a third clutch for connecting said first and second ring gears with said input shaft.

3. A speed change gear system in accordance with claim 2 wherein said brake means includes a first brake selectively engageable with said first and second ring gears, and a second brake selectively engageable with said second sun gear and said third ring gear.

4. A speed change gear system in accordance with claim 1 which further comprises:

a fourth planetary gear set including a fourth sun gear drivingly connected to said output shaft, a fourth planetary gear meshed with said fourth sun gear, a fourth ring gear meshed with said fourth planetary gear and drivingly connected to said third ring gear, and a fourth carrier rotatably supporting said fourth planetary gear; and further brake means actuatable for selective engagement with said fourth carrier.

5. A speed change gear system in accordance with claim 4 wherein said brake means includes a first brake selectively engageable with said first and second ring gears, and a second brake selectively engageable with said fourth carrier.

6. A speed change gear system in accordance with claim 4 wherein said brake means includes a first brake selectively engageable with said first and second ring gears, a second brake selectively engageable with said second sun gear and said third ring gear, and a third brake selectively engageable with said fourth carrier.

7. A speed change gear system in accordance with claim 1 which further comprises:

a fourth planetary gear set including a fourth sun gear drivingly connected to said third ring gear, a fourth planetary gear meshed with said fourth sun gear, a fourth ring gear meshed with said fourth planetary gear and drivingly connected to said output shaft, and a fourth carrier rotatably supporting said fourth planetary gear; and further brake means actuatable for selective engagement with said fourth carrier.

8. A speed change gear system in accordance with claim 7 wherein said brake means includes a first brake selectively engageable with said first and second ring gears, a second brake selectively engageable with said second sun gear and said third ring gear, and a third brake selectively engageable with said fourth carrier.

9. A speed change gear system in accordance with claim 1 which further comprises:

a fourth planetary gear set including a fourth sun gear, a fourth planetary gear meshed with said fourth sun gear, a fourth ring gear meshed with said fourth planetary gear and drivingly connected to said third ring gear, and a fourth carrier rotatably supporting said fourth planetary gear and drivingly connected to said output shaft; and further brake means actuatable for selective engagement with said fourth sun gear.

10. A speed change gear system in accordance with claim 9 wherein said brake means includes a first brake selectively engageable with said first and second ring gears, a second brake selectively engageable with said second sun gear and said third ring gear, and a third brake selectively engageable with said fourth sun gear.

11. A speed change gear system in accordance with claim 1 which further comprises:

a fourth planetary gear set including a fourth sun gear drivingly connected to said third sun gear, a fourth planetary gear meshed with said fourth sun gear, a fourth ring gear meshed with said fourth planetary gear, and a fourth carrier drivingly supporting said fourth planetary gear and drivingly connected to said output shaft; and further brake means actuatable for selective engagement with said fourth ring gear.

12. A speed change gear system in accordance with claim 11 wherein said brake means includes a first brake selectively engageable with said first and second ring gears, and a second brake selectively engageable with said fourth ring gear.

13. A speed change gear system in accordance with claim 11 wherein said brake means includes a first brake selectively engageable with said first and second ring gears, a second brake selectively engageable with said second sun gear and said third ring gear, and a third brake selectively engageable with said fourth ring gear.

* * * * *